US011972296B1

(12) United States Patent
Smith et al.

(10) Patent No.: US 11,972,296 B1
(45) Date of Patent: Apr. 30, 2024

(54) METHODS AND APPARATUSES FOR INTELLIGENTLY DETERMINING AND IMPLEMENTING DISTINCT ROUTINES FOR ENTITIES

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/142,748

(22) Filed: May 3, 2023

(51) Int. Cl.
*G06F 9/50* (2006.01)
*G06Q 10/0633* (2023.01)
*G06Q 10/0639* (2023.01)

(52) U.S. Cl.
CPC ....... *G06F 9/5027* (2013.01); *G06Q 10/0633* (2013.01); *G06Q 10/06393* (2013.01)

(58) Field of Classification Search
CPC .............. G06F 9/5027; G06Q 10/0633; G06Q 10/06393
See application file for complete search history.

(56) References Cited

U.S. PATENT DOCUMENTS

| 8,214,238 | B1* | 7/2012 | Fairfield | ............ | G06Q 30/0203 |
| | | | | | 705/7.29 |
| 8,306,923 | B1* | 11/2012 | Roache | ................. | G06Q 10/08 |
| | | | | | 705/341 |
| 10,346,444 | B1* | 7/2019 | Heitman | ............... | G06Q 10/107 |
| 11,138,528 | B2* | 10/2021 | Sullivan | ................ | G06Q 10/06 |
| 2003/0174179 | A1* | 9/2003 | Suermondt | ........... | G06F 16/358 |
| | | | | | 715/853 |
| 2004/0122702 | A1* | 6/2004 | Sabol | ..................... | G06Q 10/10 |
| | | | | | 706/45 |
| 2004/0138934 | A1 | 7/2004 | Johnson | | |
| 2007/0189514 | A1* | 8/2007 | Mehta | ..................... | H04L 12/14 |
| | | | | | 380/28 |

(Continued)

FOREIGN PATENT DOCUMENTS

| CN | 101952843 A | * | 1/2011 | ............. | G06Q 10/06 |
| CN | 101952843 A | | 1/2011 | | |

OTHER PUBLICATIONS

Sharma et al. "A Survey on Machine Learning Techniques for Source Code Analysis" (2022) (https://arxiv.org/pdf/2110.09610.pdf) (Year: 2022).*

*Primary Examiner* — Sujay Koneru
(74) *Attorney, Agent, or Firm* — Caldwell Intellectual Property Law

(57) ABSTRACT

Methods and apparatuses for intelligently determining and implementing distinct routines for entities are provided. An apparatus includes at least a processor and a memory communicatively coupled to the at least a processor, the memory containing instructions configuring the at least a processor to receive entity data associated with an entity, generate at least one distinct routine for the entity as a function of the entity data, generate a functional model as a function of the at least one distinct routine, and generate a user interface data structure configured to display and including the at least one distinct routine and the functional model. A graphical user interface (GUI) is communicatively connected to the processor and is configured to receive the user interface data structure and display the at least one distinct routine on a first portion of the GUI.

14 Claims, 7 Drawing Sheets

(56) References Cited

U.S. PATENT DOCUMENTS

| | | | | |
|---|---|---|---|---|
| 2010/0280985 | A1* | 11/2010 | Duchon | G06Q 10/10 |
| | | | | 706/54 |
| 2014/0164035 | A1* | 6/2014 | Keyser | G06Q 10/063 |
| | | | | 705/7.11 |
| 2016/0026960 | A1* | 1/2016 | Carnahan | G06Q 10/06393 |
| | | | | 705/7.39 |
| 2016/0132830 | A1* | 5/2016 | Zhang | G06F 16/24578 |
| | | | | 705/320 |
| 2018/0004803 | A1* | 1/2018 | Hao | G16H 70/20 |
| 2019/0295018 | A1 | 9/2019 | Borodow | |
| 2019/0295158 | A1* | 9/2019 | Wu | G06Q 40/02 |
| 2019/0317842 | A1* | 10/2019 | Bharti | G06F 16/285 |
| 2019/0354912 | A1* | 11/2019 | Varma | G06Q 30/0201 |
| 2021/0110317 | A1* | 4/2021 | Sridhara | G06Q 10/067 |
| 2021/0158181 | A1* | 5/2021 | Raju | G06N 5/04 |
| 2021/0297439 | A1* | 9/2021 | Hicks | G06F 11/26 |
| 2022/0292423 | A1 | 9/2022 | Ash | |
| 2022/0309411 | A1* | 9/2022 | Ramaswamy | G06Q 10/067 |

* cited by examiner

METHODS AND APPARATUSES FOR INTELLIGENTLY DETERMINING AND IMPLEMENTING DISTINCT ROUTINES FOR ENTITIES

FIELD OF THE INVENTION

The present invention generally relates to the field of artificial intelligence. In particular, the present invention is directed to methods and apparatuses for intelligently determining and implementing distinct routines for entities.

BACKGROUND

Automated systems for identification and allocation of distinct processes typically fail to perform such allocations in an efficient manner. This leads to waste in computation resources as well as real-world resources.

SUMMARY OF THE DISCLOSURE

In an aspect, an apparatus for intelligently determining and implementing distinct routines for entities includes at least a processor and a memory communicatively coupled to the at least a processor. The memory containing instructions configuring the at least a processor to receive entity data associated with an entity and generate at least one distinct routine for the entity as a function of the entity data. The generating the at least one distinct routine comprises identifying at least one institutional cohort to the entity, detecting at least one institutional routine of the institutional cohort, and determining the at least one distinct routine as a function of the at least one institutional routine. The at least a processor is further configured to generate a functional model as a function of the at least one distinct routine and generate a user interface data structure comprising the at least one distinct routine and the functional model, wherein the user interface data structure is configured to be displayed. A graphical user interface (GUI) is communicatively connected to the processor and is configured to receive the user interface data structure and display the at least one distinct routine on a first portion of the GUI.

In another aspect, a method for intelligently determining and implement distinct routines for entities comprises receiving, by at least a processor, entity data associated with an entity and generating, by at least a processor, at least one distinct routine for the entity as a function of the entity data. The generating of the at least one distinct routine comprises identifying, by the at least a processor, at least one institutional cohort to the entity, detecting, by the at least a processor, at least one institutional routine of the institutional cohort and determining, by the at least a processor, the at least one distinct routine as a function of the at least one institutional routine. The method further comprises generating, by the at least a processor, a functional model as a function of the at least one distinct routine, generating, by the at least a processor, a user interface data structure comprising the at least one distinct routine and the functional model, wherein the user interface data structure is configured to be displayed, receiving, by a graphical user interface (GUI), the user interface data structure including the at least one distinct routine and the functional model, and displaying, by the GUI, the at least one distinct routine on a first portion of the GUI.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to methods and apparatuses for intelligently determining and implementing distinct routines for entities. A further aspect of the present disclosure provides a tailored, interactive graphical user interface (GUI) presented to a user, decisionmaker, and the like associated with an entity. Information displayed by the apparatus in the GUI, including at least one distinct routine and a functional model, allows the decision maker to efficiently and in a structured manner review data associated with the entity. Aspects of the current disclosure allow for efficient and accurate identification of distinct routines associated with an entity. Exemplary embodiments illustrating aspects of the present disclosure are described below in the context of several specific examples.

Figure 1:
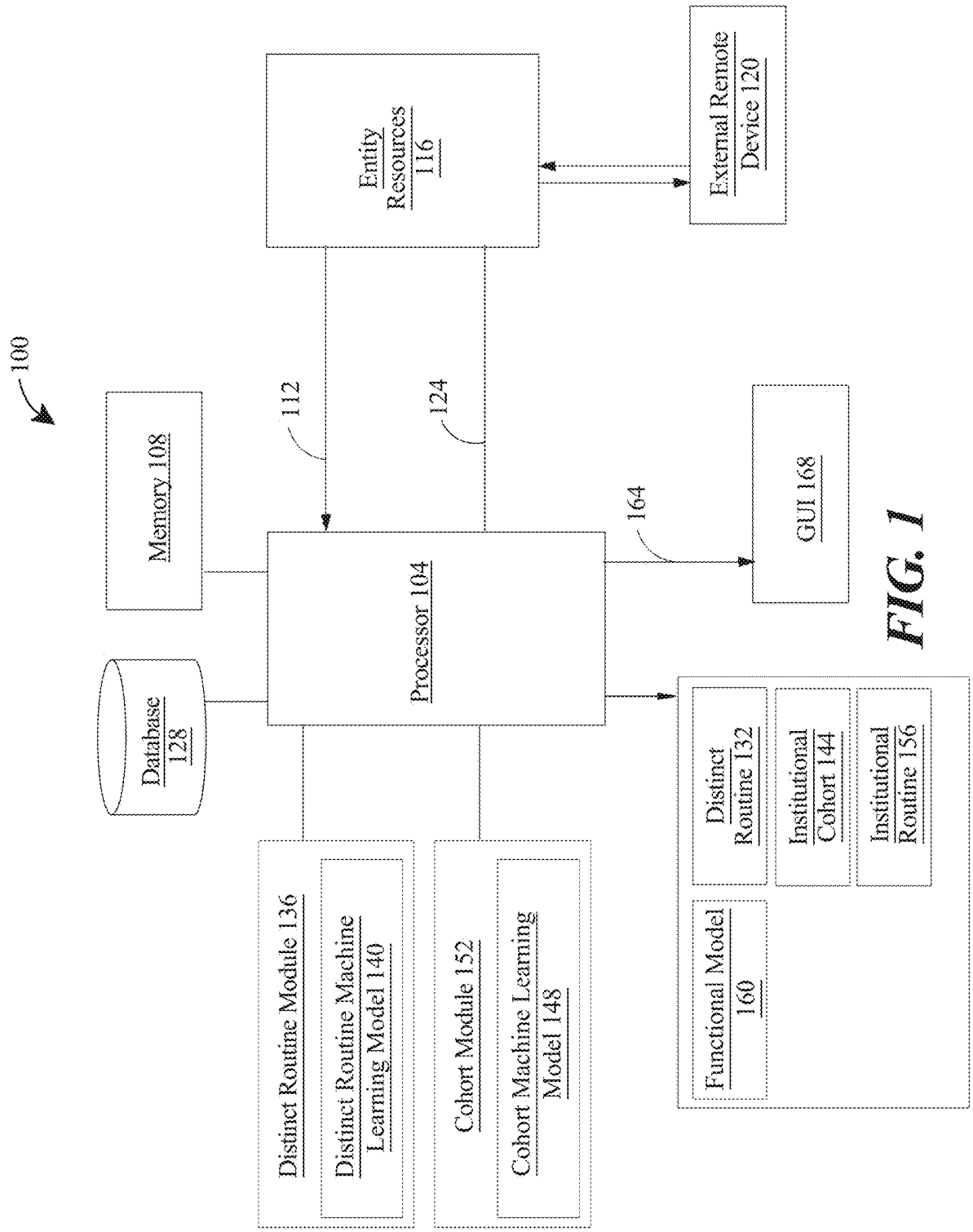
FIG. 1 is a block diagram of an apparatus for determining a risk associated with a cyber-attack.

Referring now to FIG. 1, an exemplary embodiment of an apparatus 100 for intelligently determining and implementing distinct routines for entities is illustrated. Apparatus includes a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Continuing to reference to FIG. 1, a computing device and/or apparatus 100 includes a memory 108 and at least a processor 104. Memory 108 may include any memory as described in this disclosure. Memory 108 is communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 108 may be configured to provide instructions to processor 104, which may include any processor as described in this disclosure.

With continued reference to FIG. 1, processor 104 may further comprise and/or be included in a server. A server may include a computing device and/or a plurality of computing devices that provide functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with processor 104 through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from processor 104 through a communication network.

Still referencing FIG. 1, processor 104 is configured to receive entity data 112 associated with an entity. "Entity data," as used in this disclosure, is any data and/or information about an entity or entity resources 116 and any activity engaged in by the entity and entity resources 116. As used in this disclosure, an "entity" is an organized body of people or resources. In a nonlimiting embodiment, an entity may be a company, business, and the like. As used in this disclosure, an "entity resources" is an asset that can be used by an organization to perform actions or conduct activity. In an embodiment, entity resources 116 may include an entity network, entity digital resources, and/or entity staff. As used in this disclosure, "entity network" is an integrated communications environment where digital devices communicate and manage data and interactions to and/or from an entity. In an exemplary embodiment, entity data 112 for an entity network may include data about a computer network and network interaction data between the entity network and at least one external remote device 120. As used in this disclosure, "network interaction data" is any data or information about activities to and from entity network and any external remote device. In an exemplary embodiment, network interaction data may include communications from entity network, user interactions with entity network, and the like. As used in this disclosure, "external remote device" is a computing device that is external to the entity and communicates with the entity through the entity network. In an exemplary embodiment, entity data 112 may include activity data communicated to and/or from entity resources to the at least one external remote device 120. As used in this disclosure, "activity data" is information about actions, processes, and the like provided to the at least one external remote device 120. Further, as used in this disclosure, an "entity digital resource" is any software that makes up the entity network as well as any software or device that can be accessed from the entity network. In addition, "entity staff" is any personnel and/or staff resources associated with the entity. In an exemplary embodiment, entity data 112 for entity staff may include staff role data, staff activity data, and the like. As used in this disclosure, "staff role data" is data about a current role and/or position entity staff may hold within an entity. Further, "staff activity data," as used in this disclosure, is data about activities conducted by entity staff within and/or external to the entity.

With continued reference to FIG. 1, entity resources may also include any software or digital device that can be accessed from that computer system and/or entity network. Digital device, as described above, may be any computing device as described in this disclosure, for example as described in FIG. 7. For example, the entity network may be one of a computer system, computer network, and the like. In an exemplary embodiment, the organizational network may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, the entity network may also include any electronic asset associated with the entity and connected to the entity network, as described in more detail below. For example, electronic assets may be computer programs, data, data stores, and the like, but are not limited to such examples. The organizational network may be connected to processor 104 by a network 124, as described in more detail above.

Continuing to reference FIG. 1, receiving the entity data may include receiving a user input that comprises the entity data. As used in this disclosure, a "user input," as used in this disclosure, is a form of data entry received from an individual and/or group of individuals, such as an individual and/or group of individuals that is using and/or interacting with apparatus 100. In an embodiment, the user input may be received from one or more of the entity staff associated with the entity. For example, user input may be received from a client interface staff, entity executive, and the like. In some cases, user input may include selecting a selection from plurality of selections as an answer. In other cases, user input may include a free user input as an answer to a user prompt. Additionally, or alternatively, the user input may include a plurality of entity activity data. As used in this disclosure, "entity activity data" is data about the activities conducted by the entity and entity resources. For example, entity activity data may include communications from the entity and/or entity resources, types of communications, services offered, user experience offered, and the like. In an exemplary embodiment, entity data may be in various formats such as, without limitation, txt file, JSON file, word document, pdf file, excel sheet, image, video, audio, and the like.

Still referring to FIG. 1, additionally, or alternatively, receiving the entity data may include automatedly surveying the plurality of entity resources. As used in this disclosure, "automatedly surveying" is scanning the entity network to collect information on activities conducted by entity resources connected to an entity. In a non-limiting example, automatedly surveying may include extracting data from entity resources, such as activity data of entity resources. Additionally, or alternatively, automatedly surveying the plurality of organizational resources may include connecting to an entity network and collecting activity data for the entity resources. In an embodiment, processor 104 may be configured to collect activity data for entity resources and store the activity data in a database, for example database 128. For example, processor 104 may be configured to monitor activities of the entity resources using the connection to the entity network and processor 104 may be configured to generate activity databased on the monitoring of activities within the entity network.

Continuing to refer to FIG. 1, processor 104 is further configured to generate at least one distinct routine 132 for the entity as a function of the entity data. As used in this disclosure, "distinct routine" is an established practice implemented by the entity. For example, the at least one distinct routine may be any combination of a unique experience, a unique method, a unique characteristic, and the like offered by the entity. In an embodiment, the at least one distinct routine may be determined from the entity data. In an exemplary embodiment, the at least one distinct routine 132 may be determined based on a frequency of occurrence of a particular routine within the entity data. In such an embodiment, processor 104 may be configured to determine a frequency of occurrence for each of a plurality of candidate routines. Further, processor 104 may be configured to compare the frequency of occurrence for each of the plurality of candidate routines to a threshold frequency and select at least one of the plurality of candidate routines as one distinct routine 132 based on comparing the frequency of occurrence and the threshold frequency.

Continuing to reference FIG. 1, processor 104 may use a machine learning module, such as distinct routine module 136, to implement one or more algorithms or generate one or more machine-learning models, such as distinct routine machine learning model 140, to generate the at least one distinct routine. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Distinct routine module 136 may be used to generate distinct routine machine learning model 140 and/or any other machine learning model using training data. Distinct routine machine learning model 140 may be trained by correlated inputs and outputs of training data. Training data may be data sets that have already been converted from raw data whether manually, by machine, or any other method. Training data may include previous outputs such that distinct routine machine learning model 140 iteratively produces outputs. Distinct routine machine learning model 140, using a machine-learning process, may output converted databased on input of training data.

Continuing to reference FIG. 1, in an embodiment, processor 104 may be configured to determine at least one distinct routine 132 using a machine learning model, such as distinct routine machine learning model 140 generated by distinct routine module 136. Distinct routine machine learning model 140 may be trained by training data, discussed in further detail below, such as distinct routine training data. Distinct routine training data may be stored in database 128.

With continued reference to FIG. 1, determining the distinct routine 132 using a machine learning model may include receiving distinct routine training data. In an embodiment, distinct routine training data may include entity data correlated to distinct routine data. For example, distinct routine training data may be used to show entity data may indicate a particular distinct routine. In an exemplary embodiment, a distinct routine may be a unique experience, a unique method, a unique characteristic, and the like. In a further embodiment, distinct routine training data may also include a plurality of entity data that are each correlated to at least one distinct routine of a plurality of distinct routines. In such an embodiment, distinct routine training data may be used to show how entity data 112 may indicate particular distinct routines. Determining the at least one distinct routine using a machine learning model may further include training a distinct routine machine learning model 140 as a function of distinct routine training data. Further, determining the at least one distinct routine using a machine learning model may also include generating the at least one distinct routine 132 using the trained distinct routine machine learning model 140.

Still referring to FIG. 1, generating the at least one distinct routine comprises identifying at least one institutional cohort 144 to the entity. As used in this disclosure, "institutional cohort" is a secondary organization with similar characteristics to the entity such as size, organization, area of operation, goals, and the like. In an embodiment, processor 104 may be configured to receive a user input comprising the at least one institutional cohort 144. In an embodiment, the user input may be received from one or more of the entity staff associated with the entity. For example, user input may be received from a client interface staff, entity executive, and the like. In some cases, user input may include selecting a selection from plurality of selections as an answer. In other cases, user input may include a free user input as an answer to a user prompt.

Continuing to refer to FIG. 1, in an embodiment, processor 104 may be configured to identify at least one institutional cohort 144 using a machine learning model, such as cohort machine learning model 148 generated by cohort module 152. Cohort machine learning model 148 may be trained by training data, discussed in further detail below, such as cohort training data. Cohort training data may be stored in database 128.

With continued reference to FIG. 1, identifying the at least one institutional cohort using a machine learning model may include receiving cohort training data. In an embodiment, cohort training data may include entity data 112 that are correlated to institutional cohort data. For example, cohort training data may be used to show entity data may indicate a particular institutional cohort. In an exemplary embodiment, an institutional cohort may be a competing entity with a similar area of operation, organization, market, and the like. In a further embodiment, cohort training data may also include a plurality of entity data 112 that are each correlated to at least one institutional cohort of a plurality of institutional cohorts. In such an embodiment, cohort training data may be used to show how entity data 112 may indicate particular institutional cohorts. Identifying the at least one institutional cohort using a machine learning model may further include training a cohort machine learning model 148 as a function of the cohort training data. Further, identifying the at least one institutional cohort using a machine learning model may also include generating the at least one institutional cohort 144 using the trained cohort machine learning model 148. Alternatively, or additionally, a fuzzy inferencing system for identifying the at least one institutional cohort may be employed, where any or all institutional cohorts may be represented as values and/or fuzzy sets for linguistic variables measuring the same, as described in more detail in FIG. 5. An inferencing system may use one or more fuzzy inferencing rules, as described below in FIG. 5, to output one or more linguistic variable values and/or defuzzified values indicating a plurality of institutional cohorts. Further, alternatively, or additionally, a classifier for identifying the at least one institutional cohort may be employed. In an embodiment, the classifier for identifying the at least one institution cohort may be any classifier describe herein. As a non-limiting example, classifier may be trained using training data comprising entity data correlated to one or more institutional cohorts.

Still referring to FIG. 1, generating the at least one distinct routine comprises detecting at least one institutional routine 156 of the institutional cohort 144. As used in this disclosure, "institutional routine" is an established practice implemented by the institutional cohort. For example, the at least one institutional routine may include an experience offered by the institutional cohort, a method used by the institutional cohort, and the like. In an embodiment, detecting the at least one institutional routine 156 of the institutional cohort 144 may comprise receiving institutional cohort data associated with each identified institutional cohort 144. "Institutional cohort data," as used in this disclosure is any data and/or information about an institutional cohort and any activity engaged in by the institutional cohort 144.

With continued reference to FIG. 1, in some embodiments, institutional cohort data may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape institutional cohort data from a plurality of social media sites, blogs, or forums, review sites, and the like in a virtual environment, such as the Internet. The web crawler may be seeded and/or trained with a reputable website, such as an institutional cohort website, to begin the search. A web crawler may be generated by a processor 104. In some embodiments, the web crawler may be trained with information received from an external user through a user interface. In some embodiments, the web crawler may be configured to generate a web query. A web query may include search criteria received from a user. For example, and without limitation, a user may submit a plurality of websites for the web crawler to search for institutional cohort data. Additionally, the web crawler function may be configured to search for and/or detect one or more data patterns. A "data pattern" as used in this disclosure is any repeating forms of information. A data pattern may include repeating institutional routines and the like. In some embodiments, the web crawler may be configured to determine the relevancy of a data pattern. Relevancy may be determined by a relevancy score. A relevancy score may be automatically generated by processor 104, received from a machine learning model, and/or received from the user. In some embodiments, a relevancy score may include a range of numerical values that may correspond to a relevancy strength of data received from a web crawler function. As a non-limiting example, a web crawler function may search the Internet within virtual environment for institutional cohort data related to the institutional cohort 144. The web crawler may return institutional cohort data, such as, as non-limiting examples, virtual activity data, and the like.

Continuing to reference FIG. 1, in an embodiment, processor 104 may be configured to determine at least one institutional routine 156 using a machine learning model, such as institutional routine machine learning model generated by institutional routine module. Institutional routine machine learning model may be trained by training data, discussed in further detail below, such as institutional routine training data. Institutional routine training data may be stored in database 128.

With continued reference to FIG. 1, determining the at least one institutional routine 156 using a machine learning model may include receiving institutional routine training data. In an embodiment, institutional training data may include institutional cohort data that are correlated to institutional routine data. For example, institutional routine training data may be used to show institutional cohort data may indicate a particular institutional routine. In an exemplary embodiment, an institutional routine may be an experience provided by institutional cohort, a characteristic associated with the institutional cohort, and the like. In a further embodiment, institutional routine training data may also include a plurality of institutional cohort data that are each correlated to at least one institutional routine of a plurality of institutional routines. In such an embodiment, institutional routine training data may be used to show how institutional cohort data may indicate particular institutional routines. Determining the at least one institutional routine using a machine learning model may further include training an institutional routine machine learning model as a function of institutional routine training data. Further, determining the at least one institutional routine using a machine learning model may also include generating the at least one institutional routine 156 using the trained institutional routine machine learning model.

With further reference to FIG. 1, generating the at least one distinct routine 132 comprises determining the at least one distinct routine 132 as a function of the at least one institutional routine 156. In an embodiment, processor 104 may be configured to determine the at least one distinct routine 132 based on a comparison between the at least one distinct routine 132 and the at least one institutional routine 156. For example, processor 104 may be configured to detect that a distinct routine may not be any of the at least one institutional routines and determine the distinct routine as one of the at least one distinct routine.

Continuing to reference FIG. 1, the determining the at least one distinct routine as a function of the at least one institutional routine may comprise calculating a distance metric between each distinct routine of the at least one distinct routine and each institutional routine of the at least one institutional routine. A "distance metric" as used in this disclosure, is a quantitative value indicating a degree of similarity of a set of data values to another set of data values. In some cases, a distance metric between any two or more metrics, for example each distinct routine of the at least one distinct routine 132 and each institutional routine of the at least one institutional routine 156, may be calculated using any method described in detail below.

Still referring to FIG. 1, for instance, and without limitation, each distinct routine of the at least one distinct routine and each institutional routine of the at least one institutional routine, may be represented by a vector. Each vector may be represented, without limitation, as an n-tuple of values, where n is at least two values. Each value of n-tuple of values may represent a measurement or other quantitative value associated with a given category of data, or attribute, such as a distinct routine, examples of which are provided in further detail throughout this disclosure; a vector may be represented, without limitation, in n-dimensional space using an axis per category of value represented in n-tuple of values, such that a vector has a geometric direction characterizing the relative quantities of attributes in the n-tuple as compared to each other. A non-limiting distance may include a degree of vector similarity. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting illustration, an institutional routine, and/or one or more subsets thereof, may be represented using a vector or other data structure, and a plurality of distinct routines output from one or more machine-learning processes may be represented by a like data structure, such as another vector; a distance comparing the two data structures may then be calculated and compared to distances calculations to find a minimal distance calculation and/or a set of minimal distance calculations. A set of minimal distance calculations may be a set of distance calculations less than a preconfigured threshold distance from data structure representing an institutional routine. Preconfigured threshold may be set by one or more expert users and/or determined statistically.

Still referring to FIG. 1, distance may be determined using a distance of and/or used in a classifier. A classifier used to compute distance may include, without limitation, a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements. KNN algorithm may operate according to any suitable distance, including without limitation vector similarity as described above.

With continued reference to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)–P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multi-nomial model that is used for discrete counts. Naïve Bayes classification algorithm may include a Bernoulli model that may be utilized when vectors are binary.

Continuing to reference FIG. 1, determining the at least one distinct routine as a function of the at least one institutional routine may comprise determining the at least one distinct routine as a function of the distance metric. In an exemplary embodiment, processor 104 may be configured to compare the distance metric for each combination of each distinct routine of the at least one distinct routine and each institutional routine of the at least one institutional routine to a distance threshold. As used in this disclosure, "distance threshold" is a minimum measure of difference between distinct routines and institutional routines indicating a minimum difference to identify a distinct routine as one of the at least one distinct routine 132. For example, when a distance metric between a distinct routine and an institutional routine is greater than the distance threshold, processor 104 may be configured to identify the distinct routine as one of the at least one distinct routine 132. In an embodiment, the distance threshold may be calculated by a machine-learning and/or statistical process, for instance and without limitation as described herein.

Still referring to FIG. 1, processor 104 is configured to generate a functional model 160 as a function of the at least one distinct routine. As used in this disclosure, "functional model" is a structured representation of an entity's operations that are routinely performed by the entity. In an embodiment, generating the functional model 160 as a function of the at least one distinct routine may comprise combining each distinct routine of the at least one distinct routine 132. For example, processor 104 may be configured to parse each distinct routine of the at least one distinct routine 132 and aggregate each distinct routine 132 into a functional model 160 for the entity.

With continued reference to FIG. 1, generating the functional model as a function of the at least one distinct routine further may comprise classifying each of the at least one distinct routine into a plurality of routine categories as a function of a routine classifier. For example, routine categories may include customer experience, methodology, characteristics, and the like. One skilled in the art will recognize various other types of routine categories that may exist. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as routine classification training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where ad is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Routine classifier may classify distinct routine to one or more types and/or category of routines, which may include any type of routine category, sub-categories and/or more specific categories, or the like. For instance, routine classifier may receive distinct routine data and classify the distinct routine data according to type of distinct routine such as customer experience, methodology, characteristics, or the like. Routine classifier may be trained using training data correlating distinct routine data to a type of distinct routine.

With further reference to FIG. 1, generating the functional model 160 as a function of the at least one distinct routine further may comprise selecting one distinct routine from each of the plurality of routine categories. In an exemplary embodiment, a plurality of distinct routines may be classified into a plurality of categories of distinct routine by the routine classifier and processor 104 may be configured to may be configured to select a distinct routine from each of the plurality of routine categories.

With continued reference to FIG. 1, selecting the at least one distinct routine from each of the plurality of routine categories may comprise determining a frequency datum for each of the at least one distinct routine in the entity data. As used in this disclosure, "frequency datum" is an indicator of a frequency of occurrence of a particular distinct routine in entity data 112. In an embodiment, frequency datum may be an indicator of an importance of distinct routine to the entity. For example, a frequency datum indicating a high frequency may indicate a more common occurrence of the distinct routine and a more central distinct routine for the entity. Processor 104 may be configured to determine a frequency datum for each of the at least one distinct routine and/or each distinct routine within a particular routine category.

Continuing to reference FIG. 1, selecting the at least one distinct routine from each of the plurality of routine categories may comprise comparing the frequency datum for each of the at least one distinct routine. In an exemplary embodiment, processor 104 may be configured to compare the frequency datum for each distinct routine of the at least one distinct routine. For example, processor 104 may be configured to compare a frequency datum associated with one distinct routine with each frequency datum associated with each remaining distinct routine of the at least one distinct routine. Additionally, or alternatively, in an embodiment, processor 104 may be configured to compare the frequency datum for each distinct routine within a particular routine category. For example, processor 104 may be configured to one distinct routine within a particular routine category with each frequency datum associated with each remaining distinct routine within the particular routine category.

With further reference to FIG. 1, selecting the at least one distinct routine from each of the plurality of routine categories may comprise selecting the at least one distinct routine as a function of the comparing of the frequency datum. In an embodiment, processor 104 may be configured to determine a distinct routine with the highest frequency datum based on the comparison of each frequency datum for each distinct routine within each routine category of the plurality of routine categories.

Still referring to FIG. 1, generating the functional model as a function of the at least one distinct routine further may comprise combining each of the selected distinct routines as the functional model. For example, processor 104 may be configured to aggregate each of the selected distinct routines from each routine category of the plurality of routine categories into a functional model 160 for the entity.

With continued reference to FIG. 1, processor 104 may be configured to generate a user interface data structure 164 comprising the at least one distinct routine 132 and the functional model 160, wherein user interface data structure is configured to be displayed. As used in this disclosure, "user interface data structure" is a data structure representing a specialized formatting of data on a computer configured such that the information can be organized, processed, stored, and retrieved quickly and effectively for a user interface. Additionally, or alternatively, user interface data structure 164 may further include each frequency datum, each of the plurality of routine categories, and the like. In such an embodiment, user interface data structure 164 may allow the at least one distinct routine 132 and the functional model 160 to be displayed on a display, graphical user interface, and the like. The at least one distinct routine 132 and the functional model 160 may be reviewed by a user, entity executive, and any other decisionmakers for entity to gather information quickly and efficiently about the at least one distinct routine 132 and/or the functional model 160. Additionally, layered structure for at least one distinct routine 132 and the functional model 160 may provide additional information about distinct routines that are central to the entity and data associated with these distinct routines.

Continuing to refer to FIG. 1, processor 104 is communicatively connected to a graphical user interface (GUI) 168 configured to display any information from apparatus 100 and/or any computing device. For the purposes of this disclosure, a "user interface" is a means by which a user and a computer system interact; for example, through the use of input devices and software. A user interface may include graphical user interface, command line interface (CLI), menu-driven user interface, touch user interface, voice user interface (VUI), form-based user interface, any combination thereof and the like. In some embodiments, a user may interact with the user interface using a computing device 112 distinct from and communicatively connected to at least a processor. For example, a smart phone, smart, tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a graphical form of user interface that allows users to interact with electronic devices. GUI 168 may be configured to be displayed on, without limitation, a display; the display may include any display as described in the entirety of this disclosure such as a light emitting diode (LED) screen, liquid crystal display (LCD), organic LED, cathode ray tube (CRT), touch screen, or any combination thereof.

With further reference to FIG. 1, GUI 168 may be configured to receive user interface data structure 164 for any combination of at least one distinct routine 132, the functional model 160, each frequency datum, each of the plurality of routine categories, and the like. Additionally, or alternatively, GUI 168 may be configured to display at least one distinct routine 132, the functional model 160, each frequency datum, each of the plurality of routine categories on a respective portion of GUI 168 for review by a user, entity executive, and any other decisionmakers for entity to gather information about distinct routines central to the entity. For example, at least one distinct routine 132 may be displayed on a first portion of GUI 168 and functional model 160 may be displayed on a second portion of GUI 168.

Continuing to reference FIG. 1, GUI 168 may be configured to receive a user input. In an embodiment, GUI 168 may be configured to receive a user input that selects (e.g., click on, interacts with, and the like) any portion of GUI 168. For example, portions of the GUI 168 may be a first portion displaying the at least one distinct routine 132, a second portion displaying the functional model 160, as described above, and any portion of GUI 168 may be selected by the user. Additionally, GUI 168 may be configured to display a subsequent distinct routine 132 as a function of user input. For example, GUI 168 may be configured to receive a user input selecting a first portion of GUI 168, where the at least one distinct routine 132 may be displayed, and GUI 168 may be configured to display for example, a second distinct routine 132 of the at least one distinct routine 132.

Figure 2:
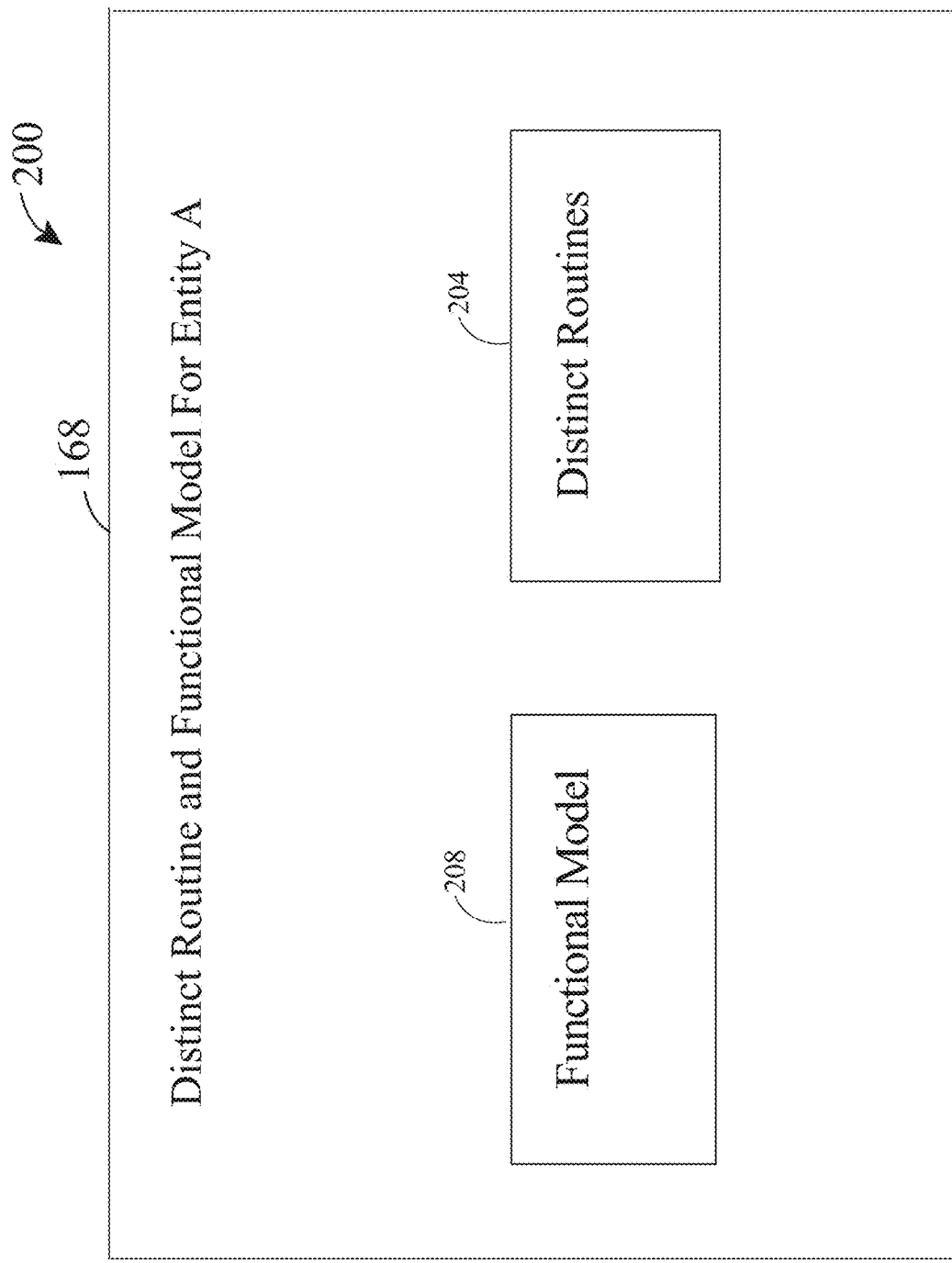
FIG. 2 is an exemplary embodiment of a graphical user interface.

Now referencing FIG. 2, an exemplary embodiment 200 of GUI 168 is shown. As used in the current disclosure, a "graphical user interface" is a graphical form of user interface that allows users to interact with electronic devices.

GUI 200 may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time. In the exemplary embodiment 200, the GUI may include a first portion 204 and a second portion 208 but is not limited to such an embodiment. First portion 204 may be configured to display at least one distinct routine. Second portion 208 may be configured to display a functional model. The at least one distinct routine may be consistent with any distinct routine as discussed herein. Functional model may be consistent with any functional model as discussed herein.

Figure 3:
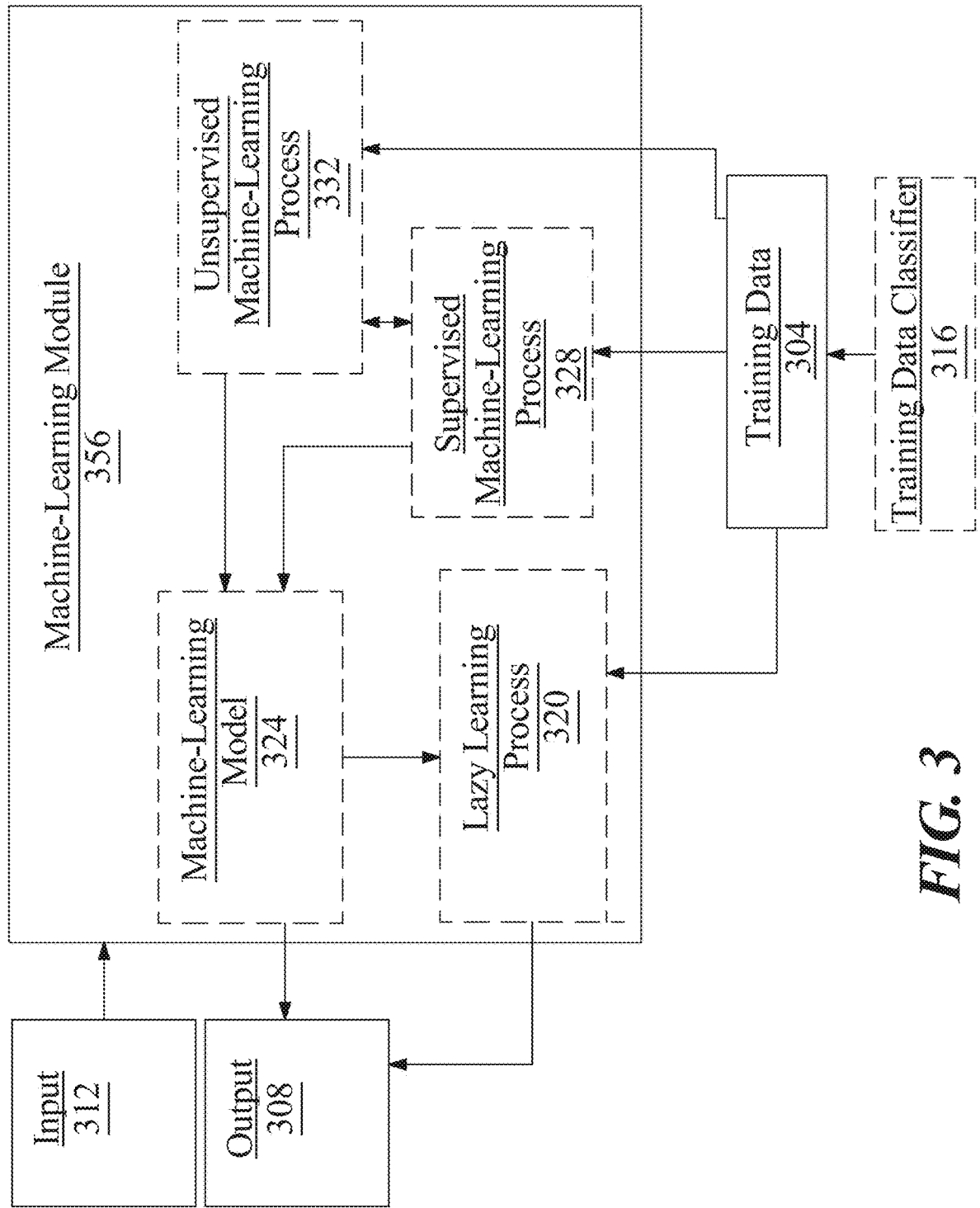
FIG. 3 is an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, a user profile may be an input and a predictive quantifier may be an output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of total cryptographic capital return for which a subset of training data may be selected.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
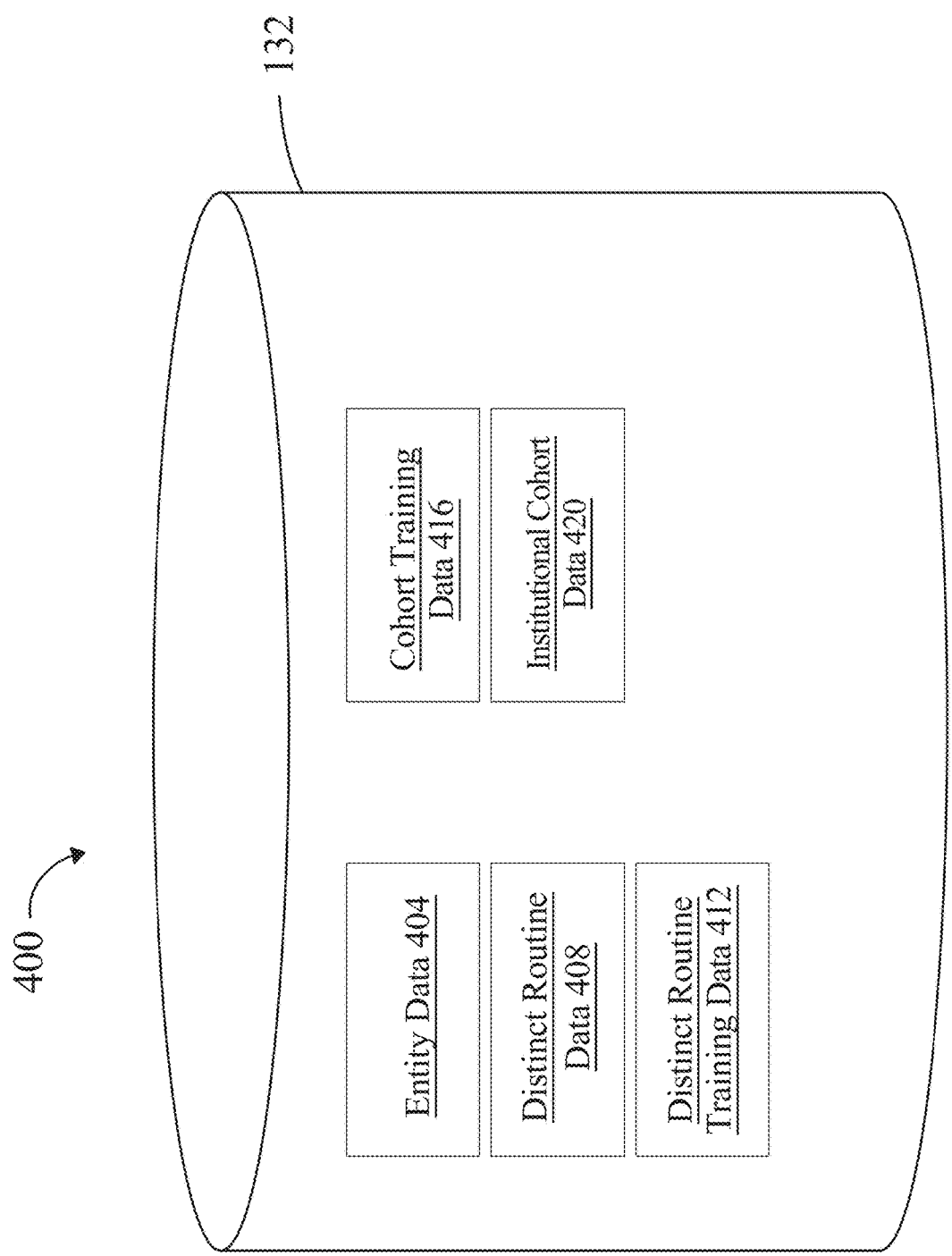
FIG. 4 is an exemplary embodiment of a database.

Now referencing FIG. 4, an exemplary embodiment 400 of database 128 is shown. Database 128 may be implemented, without limitation, as a relational database, a key-value retrieval database such as a NOSQL database, or any other format or structure for use as a database that a person skilled in the art would recognize as suitable upon review of the entirety of this disclosure. A key-value retrieval database may include any key such as voice activation. Database 128 may alternatively or additionally be implemented using a distributed data storage protocol and/or data structure, such as a distributed hash table or the like. Database 128 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Database 128 may be used to store entity data 404, at least one distinct routine data 408, distinct routine training data 412, cohort training data 416, institutional cohort data 420, and the like. Entity data 404 may be consistent with any entity data as discussed above. At least one distinct routine data 408 may be consistent with any at least one distinct routine as discussed herein. Distinct routine training data 412 and cohort training data 416 may be consistent with any training data as discussed herein. Institutional cohort data 420 may be consistent with any institutional cohort as discussed herein.

Figure 5:
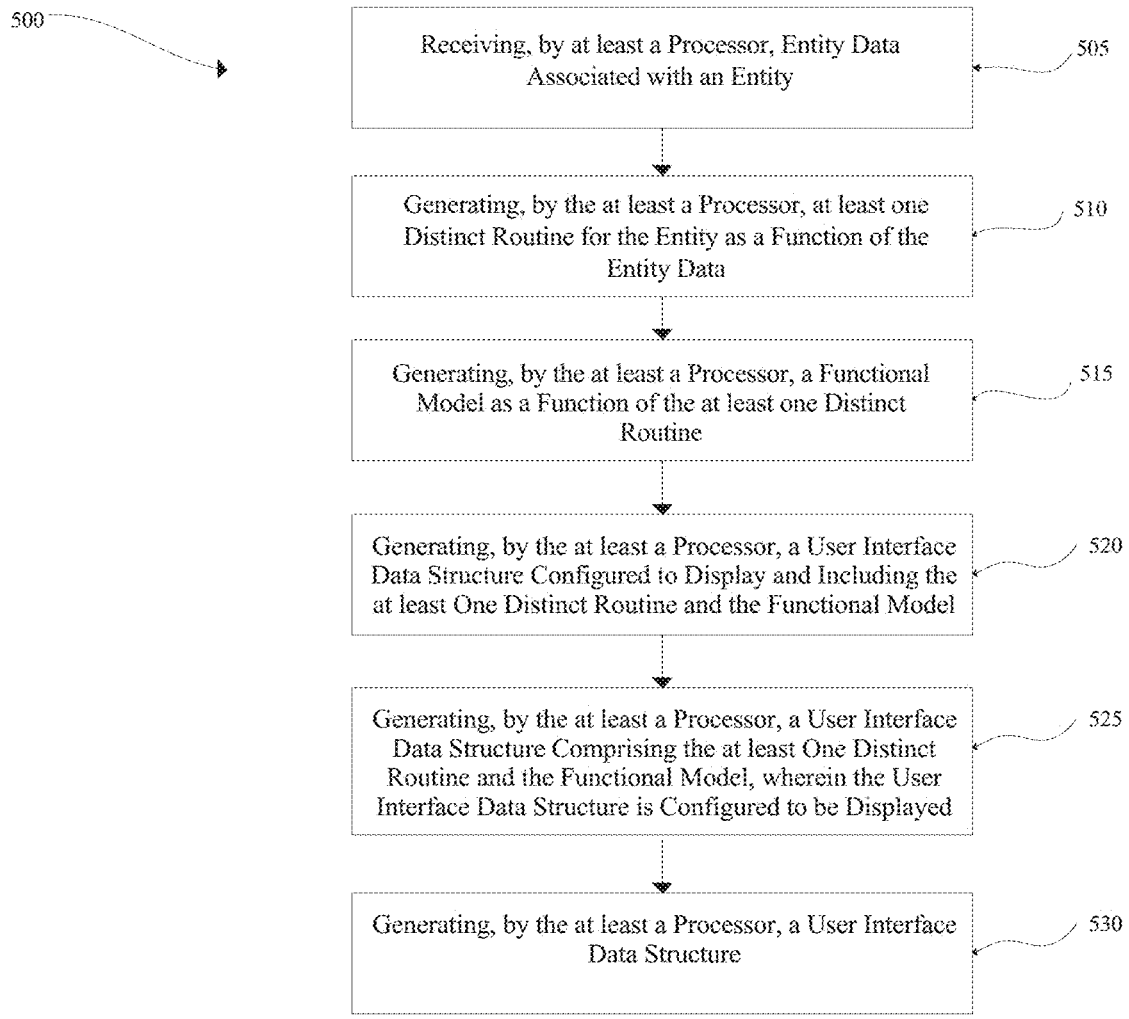
FIG. 5 is a flow diagram illustrating a method of determining a risk associated with a cyber-attack.

Referring now to FIG. 5, an exemplary embodiment of method 500 for intelligently determining and implementing distinct routines for entities is shown. Step 505 of method 500 includes receiving, by at least a processor, entity data associated with an entity. In an embodiment, the entity data may comprise network interaction data with at least one external user device. Additionally, or alternatively, entity data may comprise user-input data from at least one entity user associated with the entity. These may be implemented, without limitation, as described above in reference to FIGS. 1-4.

Still referring to FIG. 5, step 510 of method 500 includes generating, by the at least a processor, at least one distinct routine for the entity as a function of the entity data. In an embodiment, the generating the at least one distinct routine may comprise identifying, by the at least a processor, at least one institutional cohort to the entity, detecting, by the at least a processor, at least one institutional routine of the institutional cohort, and determining, by the at least a processor, the at least one distinct routine as a function of the at least one institutional routine. Additionally, or alternatively, determining the at least one distinct routine as a function of the at least one institutional routine may comprise calculating, by the at least a processor, a distance metric between each distinct routine and each institutional routine and determining, by the at least a processor, the at least one distinct routine as a function of the distance metric between each distinct routine and each institutional routine. This may be implemented, without limitation, as described above in reference to FIGS. 1-4.

With further reference to FIG. 5, step 515 of method 500 includes generating, by the at least a processor, a functional model as a function of the at least one distinct routine. In an embodiment, generating the functional model as a function of the at least one distinct routine may comprise combining, by the at least a processor, each distinct routine of the at least one distinct routine. Additionally, or alternatively, generating the functional model as a function of the at least one distinct routine further may comprise classifying, by the at least a processor, each of the at least one distinct routine into a plurality of routine categories as a function of a routine classifier, selecting, by the at least a processor, one distinct routine from each of the plurality of routine categories, and combining, by the at least a processor, each of the selected distinct routines as the functional model. In an embodiment, selecting the at least one distinct routine from each of the plurality of routine categories may comprise determining, by the at least a processor, a frequency datum for each of the at least one distinct routine in the entity data, comparing, by the at least a processor, the frequency datum for each of the at least one distinct routine, and selecting, by the at least a processor, the at least one distinct routine as a function of the comparing of the frequency datum. These may be implemented, without limitation, as described above in reference to FIGS. 1-4.

Continuing to reference FIG. 5, step 520 of method 500 includes generating, by the at least a processor, a user interface data structure comprising the at least one distinct routine and the functional model, wherein the user interface data structure is configured to be displayed. This may be implemented, without limitation, as described above in reference to FIGS. 1-4.

Continuing to reference FIG. 5, step 525 of method 500 includes receiving, by a graphical user interface (GUI), the user interface data structure. This may be implemented, without limitation, as described above in reference to FIGS. 1-4.

Continuing to reference FIG. 5, step 530 of method 500 includes displaying, by the GUI, the at least one distinct routine on a first portion of the GUI. This may be implemented, without limitation, as described above in reference to FIGS. 1-4.

Continuing to reference FIG. 5, the method 500 may further comprise receiving, by the GUI, a user input for a selection of at least one of the at least one distinct routine. Additionally, or alternatively, the method 500 may further include displaying, by the GUI, the functional model on a second portion of the GUI. These may be implemented, without limitation, as described above in reference to FIGS. 1-4.

Figure 6:
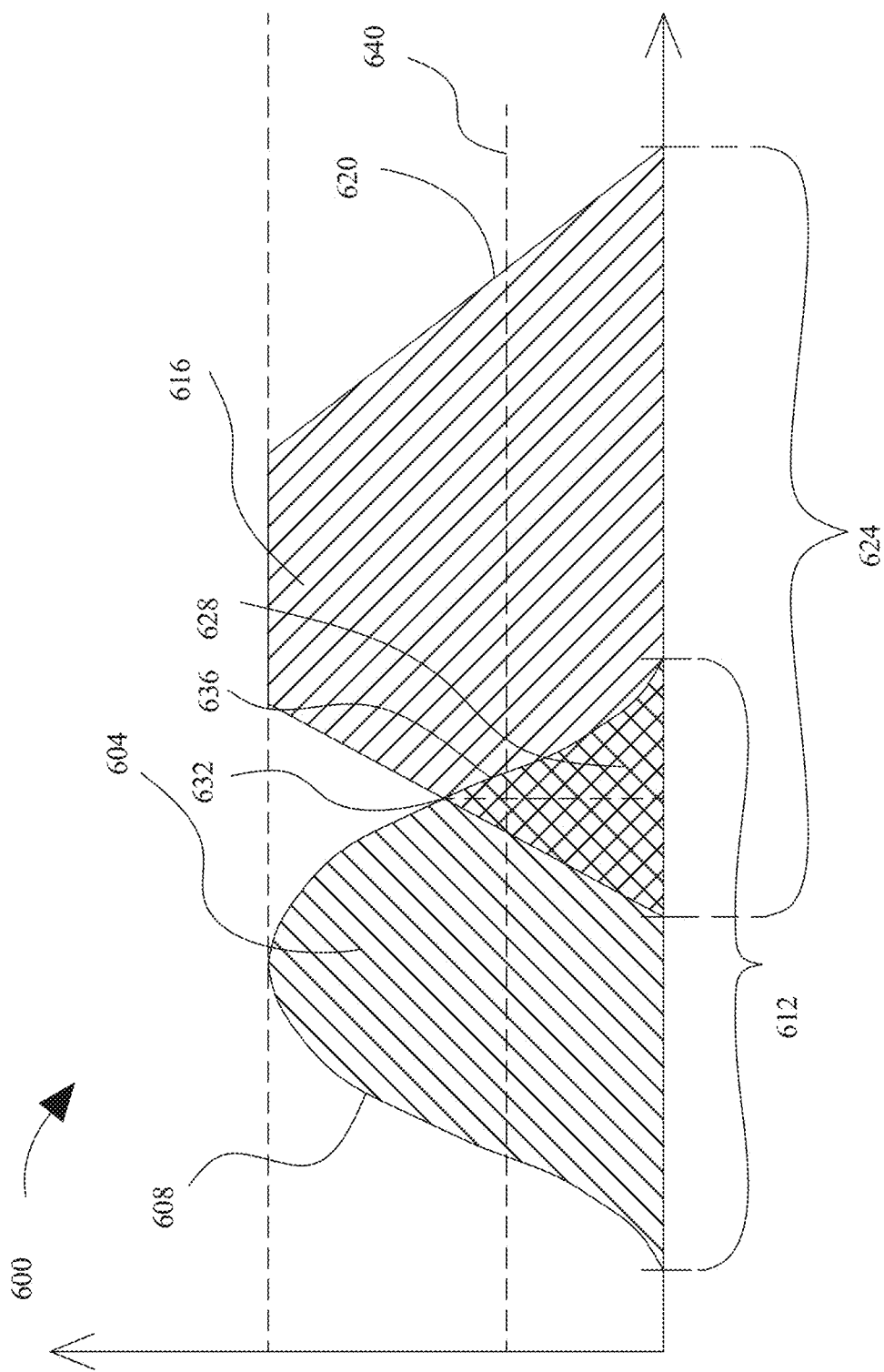
FIG. 6 is a schematic diagram illustrating an exemplary embodiment of a fuzzy inferencing system.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 662 representing a probability, as defined on probability interval, of a match between first fuzzy set 604 and second fuzzy set 616. Alternatively, or additionally, a single value of first and/or second fuzzy set may be located at a locus 666 on first range 612 and/or second range 624, where a probability of membership may be taken by evaluation of first membership function 608 and/or second membership function 620 at that range point. A probability at 628 and/or 662 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 6, in an embodiment, a degree of match between fuzzy sets may be used to identify at least one institutional cohort for the entity. For example, if entity has a fuzzy set matching a candidate institutional cohort fuzzy set by having a degree of overlap exceeding a threshold, processor 104 may determine the candidate institutional cohort as one of the at least one institutional cohort. Where multiple fuzzy matches are performed, degrees of match for each respective fuzzy set may be computed and aggregated through, for instance, addition, averaging, or the like, to determine an overall degree of match.

Still referring to FIG. 6, in an embodiment, data about the entity may be compared to multiple candidate institutional cohort fuzzy sets. For instance, entity data, as described above, may be represented by a fuzzy set that is compared to each of the multiple institutional cohort fuzzy sets; and a degree of overlap exceeding a threshold between the entity data fuzzy set and any of the multiple institutional cohort fuzzy sets may cause processor 104 to identify each of the multiple institutional cohorts associated with the fuzzy sets as institutional cohorts of the at least one institutional cohort. For instance, in one embodiment there may be two institutional cohort fuzzy sets, representing respectively a first institutional cohort and a second institutional cohort. A first institutional cohort may have a first fuzzy set; second institutional cohorts may have a second fuzzy set; and entity data may have an entity data fuzzy set. Processor 104, for example, may compare the entity data fuzzy set with each of first institutional cohort fuzzy set and second institutional cohort fuzzy set, as described above, and identify either, both, or neither of first and second institutional cohorts as the at least one institutional cohort to the entity. Machine-learning methods as described throughout may, in a non-limiting example, generate coefficients used in fuzzy set equations as described above, such as without limitation x, c, and σ of a Gaussian set as described above, as outputs of machine-learning methods. Likewise, user response may be used indirectly to determine a fuzzy set, as user response fuzzy set may be derived from outputs of one or more machine-learning models that take the user response directly or indirectly as inputs.

Still referring to FIG. 6, a computing device may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of institutional cohort as calculated using any statistical, machine-learning, or other method that may occur to a person skilled in the art upon reviewing the entirety of this disclosure. In other words, a given element of entity data may have a first non-zero value for membership in a first linguistic variable value such as a first institutional cohort and a second non-zero value for membership in a second linguistic variable value such as a second institutional cohort. In some embodiments, identifying at least one institutional cohort may include using a linear regression model. A linear regression model may include a machine learning model. A linear regression model may be configured to map entity data to one or more institutional cohort data. A linear regression model may be trained using training data as discussed above. In some embodiments, identifying at least one institutional cohort may include using an institutional cohort classification model. An institutional cohort classification model may be configured to input collected data and cluster data to a centroid based on, but not limited to, frequency of appearance, and the like. Centroids may include compatibility scores assigned to them such that each cyber profile and risk profile may each be assigned a compatibility score. In some embodiments, an urgency classification model may include a K-means clustering model. In some embodiments, an urgency classification model may include a particle swarm optimization model. In some embodiments, determining a compatibility score of user response may user response using a fuzzy inference engine. A fuzzy inference engine may be configured to map one or more data elements using fuzzy logic. In some embodiments, a plurality of institutional cohorts may be arranged by a logic comparison program into compatibility score arrangements. An "compatibility score arrangement" as used in this disclosure is any grouping of objects and/or databased on degree of match for institutional cohort. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. Continuing the example, an output linguistic variable may represent, without limitation, a first institutional cohort. An inference engine may combine rules, such as: "if the degree of similarity is 'low' and the variability level is 'low', the degree of match is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
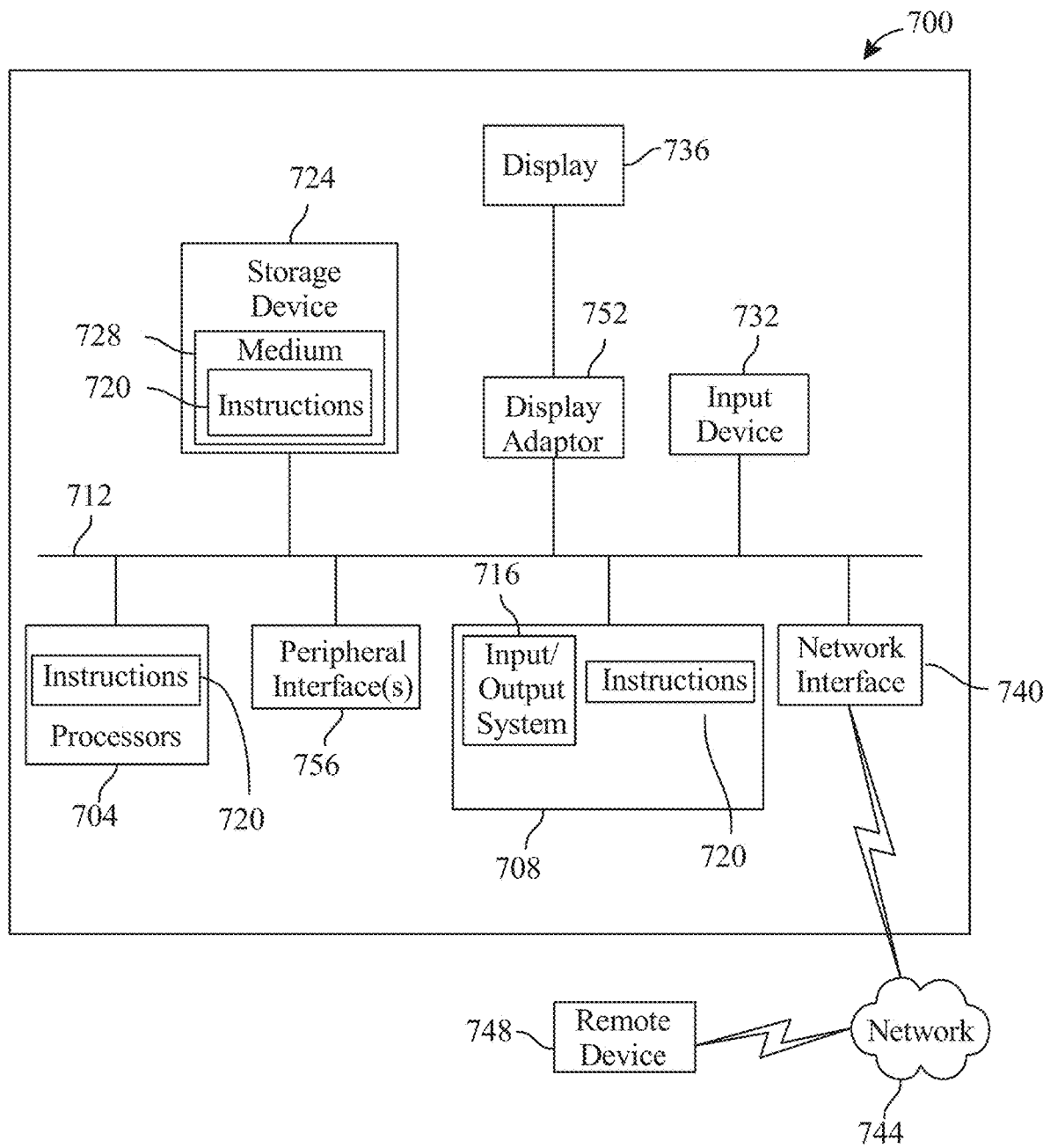
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for intelligently determining and implementing distinct routines for entities, the apparatus comprising:
    at least a processor; and
    a memory communicatively coupled to the at least a processor, the memory containing instructions configuring the at least a processor to:
        receive entity data associated with an entity;
        generate at least one distinct routine for the entity as a function of the entity data,
            wherein the at least one distinct routine is determined based on a frequency of occurrence of a particular routine within the entity data,
            wherein generating the at least one distinct routine comprises:
                identifying at least one institutional cohort to the entity,
                wherein identifying the at least one institutional cohort to the entity comprises:
                    receiving cohort training data correlating entity data to institutional cohorts;
                    training an institutional cohort machine learning model with the cohort training data, wherein the institutional cohort machine learning model is configured to receive entity data as input and output institutional cohorts; and
                    generating at least one institutional cohort as a function of the institutional cohort machine learning model;
                detecting at least one institutional routine of the institutional cohort; and
                determining the at least one distinct routine as a function of the at least one institutional routine;
        generate a functional model as a function of the at least one distinct routine,
            wherein generating the functional model as a function of the at least one distinct routine comprises:
                combining each distinct routine of the at least one distinct routine;
                classifying each of the at least one distinct routine into a plurality of routine categories as a function of a routine classifier wherein the routine classifier is trained using training data correlating distinct routine data to a type of the at least one distinct routine;
                selecting one distinct routine from each of the plurality of routine categories; and
                combining each of the selected distinct routines as the functional model; and
        generate a user interface data structure comprising the at least one distinct routine and the functional model, wherein the user interface data structure is configured to be displayed; and
    a graphical user interface (GUI) communicatively connected to the processor, the GUI configured to:
        receive the user interface data structure; and
        display the at least one distinct routine on a first portion of the GUI.

2. The apparatus of claim 1, wherein the GUI is further configured to receive a user input, wherein the user input comprises a selection of at least one of the at least one distinct routine.

3. The apparatus of claim 1, wherein the GUI is further configured to display the functional model on a second portion of the GUI.

4. The apparatus of claim 1, wherein the entity data comprises network interaction data with at least one external remote device.

5. The apparatus of claim 1, wherein receiving the entity data comprises receiving a user input from at least one entity user associated with the entity.

6. The apparatus of claim 1, wherein determining the at least one distinct routine as a function of the at least one institutional routine comprises:
    calculating a distance metric between each distinct routine of the at least one distinct routine and each institutional routine of the at least one institutional routine; and
    determining the at least one distinct routine as a function of the distance metric.

7. The apparatus of claim 1, wherein selecting the at least one distinct routine from each of the plurality of routine categories comprises:
    determining a frequency datum for each of the at least one distinct routine in the entity data;
    comparing the frequency datum for each of the at least one distinct routine; and
    selecting the at least one distinct routine as a function of the comparing of the frequency datum.

8. A method for intelligently determining and implementing distinct routines for entities, the method comprising:
- receiving, by at least a processor, entity data associated with an entity;
- generating, by the at least a processor, at least one distinct routine for the entity as a function of the entity data, wherein the at least one distinct routine is determined based on a frequency of occurrence of a particular routine within the entity data, wherein generating the at least one distinct routine comprises:
  - identifying, by the at least a processor, at least one institutional cohort to the entity, wherein identifying the at least one institutional cohort to the entity comprises:
    - receiving cohort training data correlating entity data to institutional cohorts;
    - training an institutional cohort machine learning model with the cohort training data, wherein the institutional cohort machine learning model is configured to receive entity data as input and output institutional cohorts; and
    - generating at least one institutional cohort as a function of the institutional cohort machine learning model;
  - detecting, by the at least a processor, at least one institutional routine of the institutional cohort; and
  - determining, by the at least a processor, the at least one distinct routine as a function of the at least one institutional routine;
- generating, by the at least a processor, a functional model as a function of the at least one distinct routine, wherein generating the functional model as a function of the at least one distinct routine comprises:
  - combining each distinct routine of the at least one distinct routine;
  - classifying each of the at least one distinct routine into a plurality of routine categories as a function of a routine classifier, wherein the routine classifier is trained using training data correlating distinct routine data to a type of the at least one distinct routine;
  - selecting one distinct routine from each of the plurality of routine categories;
  - combining each of the selected distinct routines as functional model;
- generating, by the at least a processor, a user interface data structure comprising the at least one distinct routine and the functional model, wherein the user interface data structure is configured to be displayed;
- receiving, by a graphical user interface (GUI), the user interface data structure; and
- displaying, by the GUI, the at least one distinct routine on a first portion of the GUI.

9. The method of claim 8, further comprising receiving, by the GUI, a user input, wherein the user input comprises a selection of at least one of the at least one distinct routine.

10. The method of claim 8, further comprising displaying, by the GUI, the functional model on a second portion of the GUI.

11. The method of claim 8, wherein the entity data comprises network interaction data with at least one external user device.

12. The method of claim 8, wherein the entity data comprises user-input data from at least one entity user associated with the entity.

13. The method of claim 8, wherein determining the at least one distinct routine as a function of the at least one institutional routine comprises:
- calculating, by the at least a processor, a distance metric between each distinct routine and each institutional routine; and
- determining, by the at least a processor, the at least one distinct routine as a function of the distance metric between each distinct routine and each institutional routine.

14. The method of claim 8, wherein selecting the at least one distinct routine from each of the plurality of routine categories comprises:
- determining, by the at least a processor, a frequency datum for each of the at least one distinct routine in the entity data;
- comparing, by the at least a processor, the frequency datum for each of the at least one distinct routine; and
- selecting, by the at least a processor, the at least one distinct routine as a function of the comparing of the frequency datum.

* * * * *